United States Patent
Kim et al.

(10) Patent No.: US 7,488,082 B2
(45) Date of Patent: *Feb. 10, 2009

(54) DISCRETELY CONTROLLED MICROMIRROR ARRAY DEVICE WITH SEGMENTED ELECTRODES

(75) Inventors: Hye Young Kim, Namwon-si (KR); Dong Woo Gim, Gyoungnam (KR); Jin Young Sohn, Fullerton, CA (US); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 11/609,882

(22) Filed: Dec. 12, 2006

(65) Prior Publication Data

US 2008/0137173 A1    Jun. 12, 2008

(51) Int. Cl.
*G02B 5/08* (2006.01)
*G02B 7/182* (2006.01)
*G02B 26/00* (2006.01)

(52) U.S. Cl. .................. 359/855; 359/872; 359/292

(58) Field of Classification Search .......... 359/291, 359/292, 295, 846, 849, 851, 853, 855, 872
See application file for complete search history.

(56) References Cited

U.S. PATENT DOCUMENTS

| | | | |
|---|---|---|---|
| 2,002,376 A | 5/1935 | Mannheimer |
| 4,407,567 A | 10/1983 | Michelet |
| 4,834,512 A | 5/1989 | Austin |
| 5,004,319 A | 4/1991 | Smither |
| 5,212,555 A | 5/1993 | Stoltz |
| 5,369,433 A | 11/1994 | Baldwin |
| 5,402,407 A | 3/1995 | Eguchi |
| 5,467,121 A | 11/1995 | Allcock |
| 5,612,736 A | 3/1997 | Vogeley |
| 5,696,619 A | 12/1997 | Knipe |
| 5,881,034 A | 3/1999 | Mano |
| 5,897,195 A | 4/1999 | Choate |
| 5,986,811 A | 11/1999 | Wohlstadter |
| 6,025,951 A | 2/2000 | Swart |
| 6,028,689 A | 2/2000 | Michaliek |
| 6,064,423 A | 5/2000 | Geng |
| 6,084,843 A | 7/2000 | Abe |
| 6,104,425 A | 8/2000 | Kanno |
| 6,111,900 A | 8/2000 | Suzudo |
| 6,123,985 A | 9/2000 | Robinson |
| 6,282,213 B1 | 8/2001 | Gutin et al. |
| 6,315,423 B1 | 11/2001 | Yu |
| 6,329,737 B1 | 12/2001 | Jerman |
| 6,498,673 B1 | 12/2002 | Frigo |
| 6,507,366 B1 | 1/2003 | Lee |

(Continued)

FOREIGN PATENT DOCUMENTS

JP    08-043881    2/1996

(Continued)

*Primary Examiner*—David N Spector (57) ABSTRACT

This invention provides a discretely controlled micromirror array device comprising a plurality of micromirrors. The discretely controlled micromirror array device forms multiple surface profiles, wherein the rotational and translational motion of each micromirror is discretely controlled by selectively activating different groups of segmented electrodes using a control circuitry. The discretely controlled micromirror array device is compatible with known semiconductor electronics technologies and provides structural stability and efficiency in motion.

60 Claims, 8 Drawing Sheets

U.S. PATENT DOCUMENTS

| | | |
|---|---|---|
| 6,549,730 B1 | 4/2003 | Hamada |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,784,771 B1 | 8/2004 | Fan |
| 6,833,938 B2 | 12/2004 | Nishioka |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,958,777 B1 | 10/2005 | Pine |
| 6,970,284 B1 | 11/2005 | Kim |
| 6,995,909 B1 | 2/2006 | Hayashi |
| 6,999,226 B2 | 2/2006 | Kim |
| 7,023,466 B2 | 4/2006 | Favalora |
| 7,031,046 B2 | 4/2006 | Kim |
| 7,046,447 B2 | 5/2006 | Raber |
| 7,068,416 B2 | 6/2006 | Gim |
| 7,077,523 B2 | 7/2006 | Seo |
| 7,161,729 B2 | 1/2007 | Kim |
| 7,365,899 B2 * | 4/2008 | Gim et al. .................. 359/295 |
| 7,410,266 B2 * | 8/2008 | Seo et al. .................. 359/851 |
| 7,411,718 B2 * | 8/2008 | Cho et al. .................. 359/290 |
| 2002/0018407 A1 | 2/2002 | Komoto |
| 2002/0102102 A1 | 8/2002 | Watanabe |
| 2002/0135673 A1 | 9/2002 | Favalora |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 | 10/2003 | Moon |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264870 A1 | 12/2005 | Kim |
| 2006/0012766 A1 | 1/2006 | Klosner |
| 2006/0012852 A1 | 1/2006 | Cho |
| 2006/0028709 A1 | 2/2006 | Cho |
| 2006/0187524 A1 | 8/2006 | Sandstrom |
| 2006/0209439 A1 | 9/2006 | Cho |
| 2007/0064301 A1 * | 3/2007 | Cho et al. .................. 359/291 |
| 2008/0225369 A1 * | 9/2008 | Kim et al. .................. 359/223 |

FOREIGN PATENT DOCUMENTS

| | | |
|---|---|---|
| JP | 11-069209 | 3/1999 |
| JP | 2002-288873 | 10/2002 |

* cited by examiner

| Line Address | | | | Configuration Table | | | | | | | | | | |
|---|---|---|---|---|---|---|---|---|---|---|---|---|---|---|
| SP No. | A2 | A1 | A0 | Matrix Table Address | F0 SE0 | F1 SE1 | F2 SE2 | F3 SE3 | F4 SE4 | F5 SE5 | F6 SE6 | F7 SE7 | F8 SE8 | F9 SE9 |
| 1 | 0 | 0 | 0 | TA0 | 0 | 0 | 0 | 1 | 0 | 1 | 0 | 0 | 1 | 1 |
| 2 | 0 | 0 | 1 | TA1 | 1 | 0 | 0 | 0 | 0 | 1 | 1 | 1 | 0 | 0 |
| 3 | 0 | 1 | 0 | TA2 | 0 | 1 | 0 | 1 | 0 | 0 | 1 | 0 | 0 | 0 |
| 4 | 0 | 1 | 1 | TA3 | 1 | 0 | 0 | 1 | 1 | 0 | 1 | 1 | 1 | 1 |
| 5 | 1 | 0 | 0 | TA4 | 0 | 0 | 0 | 1 | 1 | 0 | 0 | 0 | 1 | 1 |
| 6 | 1 | 0 | 1 | TA5 | 0 | 1 | 1 | 0 | 1 | 1 | 0 | 1 | 1 | 1 |
| 7 | 1 | 1 | 0 | TA6 | 1 | 0 | 1 | 0 | 0 | 1 | 0 | 1 | 0 | 0 |
| 8 | 1 | 1 | 1 | TA7 | 1 | 0 | 1 | 0 | 1 | 0 | 0 | 0 | 1 | 1 |

FIG. 7b

DISCRETELY CONTROLLED MICROMIRROR ARRAY DEVICE WITH SEGMENTED ELECTRODES

FIELD OF INVENTION

The present invention relates to a micromirror array device. Particularly, the invention relates to discretely controlled micromirror array device providing multiple surface profiles, wherein each micromirror has independent motion of rotation and translation using segmented electrodes.

BACKGROUND OF THE INVENTION

Micromirror array devices have been developed because it can substitute for conventional optoelectronic devices. Phase-only piston-style micromirrors were used for phase adaptive optics applications, and rotational micromirrors were used to deflect light. These micromirrors have been controlled by analog control to have continuous displacement, which is determined at the equilibrium between electrostatic force and elastic force. The analog control is more complex than the digital or discrete control, and is not compatible with known semiconductor electronics technologies such as MOS, CMOS, etc.

In the prior art of a micromirror array such as the Digital Micromirror Device in U.S. Pat. Nos. 4,566,939, 5,083,857, and 6,232,936, each micromirror is actuated by digital voltage control and can have large rotation with low driving voltage. It is compatible with known semiconductor electronics technologies but has only single degree of freedom; rotation about an axis with two level positions. So, the micromirror array is merely the array of optical switches.

The capability of the micromirror array is not limited to only optical switches. The micromirror array can be used to simulate curved optical surfaces by changing its surface profile. The micromirror array described in J. Boyd and G. Cho, 2003, "Fast-response Variable Focusing Micromirror Array Lens," *Proceeding of SPIE* Vol. 5055: pp. 278-286 can provide axis-symmetric lenses, wherein every mirror at given radius is controlled by one pair of a circular electrode and a circular ground electrode. However, this micromirror array has difficulties to make a micromirror array have a desired surface profile simulating such as aspherical (e.g. parabolic, hyperbolic, elliptical, etc), or non-axis-symmetric lenses.

Some micromirrors are provided with more degrees of freedom using multiple electrodes. U.S. Pat. No. 6,687,112 to Chiou discloses a control system having a rotating and a translating actions for an electrostatically-driven micro-electromechanical device comprising a movable plate, multiple electrostatically-driving electrodes, and a controller to determinate operation characteristics of the electrostatically-driven micro-electromechanical device and selecting electrode patterns through a switching matrix circuit. In this system, the attractive forces are applied to micromirror itself, which may cause a structural deformation due to residual stress leading to the degradation of the image quality. Also, the variation of the height of the electrodes in the direction of translational motion is not utilized while the variation of the height of the electrodes can provide the effective control of the micromirror. Further, this system does not provide a micromirror array system capable of providing multiple surface profiles.

U.S. Pat. No. 6,906,848 to Aubuchon discloses micromirror systems providing a micromirror array wherein at least one of electrodes is configured with a plurality of portions at different levels, so that portions further from a center of rotation of a micromirror are at a greater distance from the micromirror than portions closer to the center of rotation for sequential attraction of the micromirror portion. This system, however, is operated in the analog mode, which requires complex and fine control of voltage and can cause a snap down problem. Considering the number of micromirrors in the micromirror array which can be reached to tens of millions and the number of electrodes required for each micromirror, digitally or discretely controlled micromirror array systems can be used more advantageously. Further, the attractive forces are applied to micromirror itself, which may cause a structural deformation due to residual stress leading to the degradation of the image quality.

To be applied more widely, a discretely controlled micromirror array device is required to provide multiple surface profiles, low structural deformation, and compatibility with known semiconductor electronics technologies.

SUMMARY OF THE INVENTION

The present invention contrives to solve the disadvantages of conventional micromirror array devices.

One objective of the invention is to provide a discretely controlled micromirror array device, wherein each micromirror has multiple degrees of freedom motion including rotational and/or translational motion.

Another objective of the invention is to provide a discretely controlled micromirror array device, wherein the rotational and translational motion of each micromirror is controlled to have multiple positions and orientations by selectively activated segmented electrodes.

Still another objective of the invention is to provide a discretely controlled micromirror array device forming multiple surface profiles discretely, wherein each micromirror is independently controlled to have a required position and orientation.

Still another objective of the invention is to provide a discretely controlled micromirror array device having compatibility with known semiconductor electronics technologies.

Still another objective of the invention is to provide a discretely controlled micromirror array device with structural stability and efficiency in motion.

A discretely controlled micromirror array device comprises a substrate with a control circuitry and a plurality of micromirrors forming a micromirror array. Each micromirror in the micromirror array comprises a micromirror structure having a reflective surface on one side, a plurality of segmented electrodes disposed on the substrate surface, electronically coupled to the control circuitry for activating segmented electrodes selectively, at least one flexible structure for connecting the micromirror structure and the substrate and providing restoring force to the micromirror structure, and at least one pillar structure for supporting the flexible structure and providing connection between the substrate and the flexible structure. The micromirrors have rotational and translational motions. The micromirrors have multi-degrees of freedom motion. The rotational and translational motions of each micromirror are controlled to have a required position and orientation by selectively activated segmented electrodes. The micromirrors in the micromirror array form at least one surface profile.

The control circuitry is constructed underneath the segmented electrodes and coupled with the segmented electrodes in order to selectively activates or deactivates the segmented electrodes. The activated segmented electrodes of each micromirror attract different portions of the micromirror structure so that the micromirror structure has a required position and orientation. As the micromirrors have the corresponding required positions and orientations, the array of those micromirrors forms a desired surface profile.

The control circuitry is an electrical addressing circuitry. The electrical addressing circuitry comprises a plurality of memory type cell forming a memory addressing array, wherein each memory type cell controls at least one segmented electrodes or each segmented electrode is controlled by at least one memory type cell.

The memory addressing array can comprise Static Random Access Memory (SRAM) circuits or their variations to activate or to deactivate the segmented electrodes. The SRAM circuits comprise a plurality of SRAM type cells. A typical SRAM cell includes six transistors as well as a word line and at least one bit line, wherein the four transistors form two cross coupled inverters to store a bit of data and the other two transistors are used to control the access to the bit information. When the word line is enabled, the transistors for the access control are open and the required voltage is applied through the bit line to charge a corresponding segmented electrode to attract the micromirror structure.

Also, the memory addressing array can comprise Dynamic Random Access Memory (DRAM) circuits or their variations to activate or to deactivate the segmented electrodes. The DRAM circuits can comprise a plurality of DRAM type cells. A typical DRAM cell includes at least one capacitor to store a bit of data, at least one transistor to control the access to the bit information, a word line, and at least one bit line. In the discretely controlled micromirror array device, the segmented electrodes and the mirror structure can form a capacitor. When the word line is enabled, the transistor for the access control is open and the required voltage is applied through the bit line to charge a corresponding segmented electrode to attract the mirror structure. While the DRAM circuits are structurally simple, they require the periodic refreshment of the capacitor charge in order to prevent a charge leakage problem.

The control circuitry comprises a MOS-type or CMOS-type circuitry on the substrate. Since the control circuitry is fabricated and operated by MOS or CMOS technologies, the discretely controlled micromirror array device has lots of advantages including lower power consumption and high noise immunity.

The control circuitry is electronically isolated by a passivation layer. The passivation layer is configured to provide electrical isolation between the control circuitry and the moving elements of the micromirror. The control circuitry lies beneath the passivation layer so that the electrode area can be maximized and the influence of electric field generated by the control circuitry can be minimized. Also, all the moving mechanical parts can be held at the same or ground potential.

The control circuitry is operated by digital voltage. A typical digital voltage driver provides high and low voltage levels, wherein a fixed voltage (high voltage) is supplied to the segmented electrodes for activation. Furthermore, the control circuitry supplies a discrete control signal to the segmented electrodes, wherein the voltage driver provides a plurality of discrete voltage levels to the segmented electrodes so that each segmented electrode can be controlled by a different voltage.

The flexible structure provides restoring force to the micromirror structure and can be a kind of micro structured spring having the shape of beam, serpentine-type, spiral-type, and so on. For the precise control of micromirror motion, the flexible structure must be designed to have an appropriate rotational and translational stiffness. In order to have the desired structure with sufficient stiffness, the flexible structure should be varied in its shape and size. Also, the flexible structure has to be designed to cover the range of the desired translational and rotational motions of the micromirror. The flexible structure of the micromirror and the general principle, structure, control, and methods for making the micromirror array devices and Micromirror Array Lens are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/463,875 filed Aug. 10, 2006, U.S. patent application Ser. No. 11/534,613 filed Sep. 22, 2006, and U.S. patent application Ser. No. 11/534,620 filed Sep. 22, 2006, all of which are incorporated herein by references.

Each micromirror can have rotational and/or translational motions by selectively activated segmented electrodes. The optimal or suboptimal sets of segmented electrodes can be selected and stored to provide the required position and orientation of the micromirror. Depending on applications and geometry, each micromirror can comprise one degree of freedom translational motion, one degree of freedom rotational motion, two degrees of freedom rotational motion, one degree of freedom rotational and one degree of freedom translational motions, or two degrees of freedom rotational and one degree of freedom translational motions. The discretely controlled micromirror array device having higher degrees of freedom motion such as two degrees of freedom rotational and one degree of freedom translational motions provides better performance by building an enhanced quality micromirror array device.

Since each micromirror has its own group of segmented electrodes and each segmented electrode can be activated individually, the motion of each micromirror can be independently controlled. Also, the motion of each micromirror can be discretely controlled to have a plurality of positions and orientations for forming a plurality of surface profiles, wherein the motion of the micromirror is controlled by the selected set of activated segmented electrodes. Furthermore, the motion of the micromirror can be controlled by supplying a plurality of voltage levels to all or a part of segmented electrodes that need to be activated.

The segmented electrode shape and arrangement for each micromirror in the micromirror array is substantially same. For making actual micromirror device with segmented electrodes, many simulations, tests, and measurements for the micromirror motion should be accompanied with respect to the shape, size, and arrangement of the segmented electrodes. If all the micromirrors have the same shape, size, and arrangement of the segmented electrodes in the micromirror, the effort and labor for simulations, test, and measurements for the micromirror motion can considerably be reduced.

The micromirror array reproduces a predetermined free surface by controlling the rotational and/or translational motions of the micromirrors.

By forming an optical surface profile, the micromirror array can be built as a lens, which is the Micromirror Array Lens. The general principle and methods for making the Micromirror Array Lens are disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 6,999,226 issued Feb. 14, 2006 to Kim, U.S. Pat. No. 7,095,548 issued Aug. 22, 2006 to Cho, and U.S. patent application Ser. No. 10/857,714 filed May 28, 2004, U.S. patent application Ser. No. 10/893,039 filed Jul.

16, 2004, U.S. patent application Ser. No. 10/983,353 filed Nov. 8, 2004, U.S. patent application Ser. No. 11/076,616 filed Mar. 10, 2005, and U.S. patent application Ser. No. 11/426,565 filed Jun. 26, 2006, all of which are incorporated herein by references. Also, the general properties of the Micromirror Array Lens are disclosed in U.S. Pat. No. 7,057,826 issued Jun. 6, 2006 to Cho, U.S. patent application Ser. No. 10/896,146 filed Jul. 21, 2004, U.S. patent application Ser. No. 10/979,568 filed Nov. 2, 2004, U.S. patent application Ser. No. 10/979,612 filed Nov. 2, 2004, U.S. patent application Ser. No. 11/218,814 filed Sep. 2, 2005, U.S. patent application Ser. No. 11/359,121 filed Feb. 21, 2006, U.S. patent application Ser. No. 11/382,273 filed May 9, 2006, and U.S. patent application Ser. No. 11/429,034 filed May 5, 2006, all of which are incorporated herein by references.

To form a good lens, the lens must satisfy two conditions. One is the convergence condition that all light rays scattered from one point of an object should converge into one point of an image plane. The other is the phase matching condition that all converging light rays should have the same phase at the image plane. To satisfy the lens conditions, the surface of conventional reflective lens is formed to have all light rays scattered by one point of an objective be converged into one point of the image plane and have the optical path length of all converging light rays be the same.

The micromirror array arranged in a substantially flat surface can satisfy the two conditions. The surface profile of the micromirror array satisfies the convergence condition, wherein arbitrary scattered light rays from one point of the object are converged into one point of the image plane by adjusting the rotational and/or translational motions of each micromirror. Also, the surface profile of the micromirror array satisfies the phase matching condition, wherein the phases of all converging light rays are adjusted to be the same. Even though the optical path lengths of light rays converged by the discretely controlled micromirror array device are different from those of an equivalent conventional reflective lens, the same phase condition can be satisfied by adjusting the rotational and/or translational motions of each micromirror because the phase of light is periodic. The required maximum translational displacement is at least half of the wavelength of light. Half wavelength of translational motion is enough to satisfy the same phase condition by use of the periodicity of the light. The micromirror array satisfies both convergence and phase matching conditions. Therefore, the micromirror array can form a Micromirror Array Lens having the surface profile with satisfying the convergence and the phase matching conditions and performing the lens properties.

The micromirror array has a plurality of surface profiles since each micromirror can have a plurality of positions and orientations. The surface profile is discretely controlled by activating various selected sets of the segmented electrodes of each micromirror and/or applying a plurality of discrete voltage levels to the segmented electrodes of each micromirror. Each surface profile satisfies the convergence and the phase matching conditions. The micromirror array has a plurality of optical surface profiles which are discretely controlled. Therefore, the micromirror array forms a variable focusing Micromirror Array Lens having a plurality of surface profiles with satisfying the convergence and the phase matching conditions. Each surface profile represents the lens of the corresponding focal length. The focal length of the variable focusing Micromirror Array Lens is discretely changed by adjusting the rotational and/or translational motions of each micromirror. The general principle, methods for making the micromirror array devices and Micromirror Array Lens, and their applications are disclosed in U.S. Pat. No. 7,077,523 issued Jul. 18, 2006 to Seo, U.S. Pat. No. 7,068,416 issued Jun. 27, 2006 to Gim, U.S. patent application Ser. No. 10/914,474 filed Aug. 9, 2004, U.S. patent application Ser. No. 10/934,133 filed Sep. 3, 2004, U.S. patent application Ser. No. 10/979,619 filed Nov. 2, 2004, U.S. patent application Ser. No. 10/979,624 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382,707 filed May 11, 2006, U.S. patent application Ser. No. 11/419,480 filed May 19, 2006, and U.S. patent application Ser. No. 11/423,333 filed Jun. 9, 2006, all of which are incorporated herein by references.

The micromirror array further comprises an electronic circuit to process input data and control the micromirror control circuitry to form a surface profile. The electrode circuit includes a logic circuitry and a voltage driver. The electronic circuit provides a discrete input signal to the micromirror array to form the corresponding surface profile. The logic circuitry has a configuration table to store motion data for the surface profile, wherein the motion data includes a status of each segmented electrode and/or a voltage level to be applied to each segmented electrode.

The reflective surface of each micromirror has a high reflectivity provided by a metal or metal compound layer. The metal layer is made of the material selected from the group consisting of silver (Ag), aluminum (Al), gold (Au), nickel (Ni.), chromium (Cr), and platinum (Pt) to have high reflectivity. Also, the reflectivity of the metal layer is enhanced by dielectric coating layers, wherein the surface of the metal layer is coated with dielectric materials such as magnesium fluoride ($MgF_2$), calcium fluoride ($CaF_2$) with zinc sulfide (ZnS) or titanium oxide ($TiO_2$), and so on. The metal layer can be protected by an additional protective coating layer deposited on the metal layer with the material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), calcium fluoride ($CaF_2$), zinc sulfide (ZnS), zinc selenide (ZnSe), polycarbonate, polyester, polyethylene naphthalate, fluoropolymer, and so on. Instead, the reflective surface of each micromirror can have a high reflectivity provided by dielectric layers.

In the discretely controlled micromirror array device, the segmented electrodes are selectively activated by the control circuitry and induce electrostatic force to control the motions of the micromirrors. The shape of the segmented electrodes is substantially identical. The size of the segmented electrodes is also substantially identical. Instead, the segmented electrodes can have a plurality of variations in size as well as in shape. The shape and size of the segmented electrodes can be varied in order to have required motions and to satisfy the required motional accuracy. The shape and size of the segmented electrodes also can be varied in association with the shape and size of the micromirror structure in order to increase the effective actuation area and prevent interference with adjacent micromirror structures. In addition, since the electrostatic force generated by the voltage difference between the micromirror structure and the corresponding activated segmented electrode is proportional to the inverse square of the distance between the micromirror structure and the corresponding activated segmented electrode, the segmented electrodes can have a plurality of variations in height from the substrate, wherein the height of each segmented electrode is determined so that the induced electrostatic force is maximized without hindering the motion of the micromirror.

All micromirrors can have the identical arrangement of its segmented electrodes, which allows easier design and fabrication. The appropriate sets of the segmented electrodes that need to be activated to provide the required positions and orientations of each micromirror are evaluated and stored in a configuration table. In this case, the segmented electrodes of each micromirror are distributed with substantially evenly spaced separation. The number of feasible positions and orientations is $2^m-1$ for a micromirror having m segmented electrodes. For a given position and orientation of the micromirror, an optimal or a suboptimal set of the segmented electrodes to be activated can be found to provide the position and orientation of the micromirror, which are substantially close to the desired position and orientation of the micromirror with the required accuracy. As the number of the segmented electrodes increases, the motion of the micromirror can be adjusted more precisely. On the other hand, the segmented electrodes of each micromirror can be arbitrary distributed to have a plurality of positions and orientations of the micromirror and/or increase the motion accuracy of the micromirror. In this case, the arrangement of segmented electrodes in each micromirror is optimized to provide the multiple motions of the micromirror, effectively. The best in-plane positions of the segmented electrodes providing the required positions and orientations of each micromirror are evaluated and then the segmented electrodes are placed at the corresponding positions on the substrate surface, which provides better accuracy for controlling the motions of the micromirror. It also makes reduce the number of required segmented electrodes.

The motion of each micromirror can be controlled by appropriate combinations of sizes, heights, and in-plane positions of the segmented electrodes, and voltages applied to the corresponding segmented electrodes.

The micromirror further comprises at least one top electrode plate, wherein the top electrode plate is disposed under the micromirror structure. The micromirror is controlled by actuation force between the top electrode and the segmented electrodes. By introducing at least one top electrode plate as an actuation layer, the segmented electrodes on the substrate pull the top electrode rather than the micromirror structure itself. In result, the acting gap of the electrostatic force is considerably reduced and the acting area of the electrostatic force is considerably increased. Therefore, the top electrode plate increases the electrostatic force induced between the segmented electrodes and the top electrode and also increases motion efficiency of the micromirror array.

The structural deformation of the micromirror structure is substantially reduced by connecting the micromirror structure to the top electrode plate using at least one top electrode post. Since the top electrode and the micromirror structure are just structure with two layers, they have a strong resistance to the deformation of the structures. The post structure connecting the micromirror structure and the top electrode prevents deformation of the micromirror structure. The micromirror device can have multiple top electrode posts connecting the top electrode plate and the micromirror structure to prevent deformation of the micromirror structure. During the design and optimization process, more top electrode posts can be placed where the deformation of the micromirror is severe. The multiple top electrode posts also gives firm attachment between the top electrode and micromirror structure thus provides structural stability of the micromirror array device. The strong attachment between the micromirror structure and the top electrode plate must be present since the top electrode is the actually attracted part by the electrostatic force and the micromirror structure is the structure to be attracted for operation. If the top electrode is not applied, the motion of the micromirror can not be controlled with high accuracy of motion. Since the gap between the mirror plate and segmented electrodes is larger than that with top electrode, the electrostatic force is not effective. Also since the electric filed is screened or affected by the spring structure, the motion of the micromirror cannot be controlled with high accuracy.

The flexible structure can be located in the same layer with the top electrode plate. Also, the flexible structure is located between the top electrode plate and the micromirror structure. The flexible structure between the top electrode and the micromirror structure has two major advantages in design and operation of the discretely controlled micromirror array device. Since the flexible structure is not located in the same layer with the top electrode plate, the top electrode area can be maximized to have stronger electrostatic force. And the flexible structure also has more flexibility thanks to the large area for the effective spring. Thanks to the increased area for the flexible structure in its own layer, the micromirror device has higher efficiency of the motion and can also be operated with lower operating voltage.

Since the rotational motion of the micromirror should be isotropic around the center of the micromirror, it is desirable for the flexible structure to have a rotational symmetry around the center of the micromirror. For example, two fold rotational symmetry for the double flexible structure, three fold rotational symmetry for triple flexible structure, four fold rotational symmetry for quadruple flexible structure and so on are desirable for the high accuracy micromirror motion control. If there exists residual stress in the flexible structure after the releasing process of the micromirror, the micromirror cannot have the desired motion since the micromirror and the top electrode structures have initial tilt or rotational motion. The flexible structure with rotational symmetry prevents the micromirror structure from having initial tilt or rotational motion. The flexible structure with rotational symmetry increases the motion stability and accuracy of the micromirror regardless of the electrode size, shape, and distribution.

The micromirrors in the micromirror array have independently controlled motions to make a spatial light modulator. The micromirrors in the spatial light modulator are controlled to retract or elevate to remove the phase aberration of an optical system. The one or two degrees of freedom rotation of the micromirrors is controlled to control light intensity. Also, the one or two degrees of freedom rotation of the micromirrors is controlled to scan a field of regard. Along with the rotational degrees of freedom, translational degree of freedom motion can be achieved to make a fine spatial light modulator.

The present invention also provides a discretely controlled micromirror array device with a method for generating a configuration table and a method for forming multiple surface profiles. A method generating a configuration table comprises steps of a) selecting a desired surface profile; b) selecting a set of the segmented electrodes for each micromirror to be activated to form the desired surface profile and determining the status of each segmented electrode; c) determining a voltage level required to be applied to each segmented electrode; d) storing motion data including the statuses and the voltage levels required for all segmented electrodes in the configuration table; e) assigning a line address for the motion data stored in step d); and f) repeating steps a) to e) for all desired surface profiles.

A method forming multiple surface profiles by a discretely controlled micromirror array device comprises steps of a) receiving a input signal corresponding to a desired surface profile; b) finding a line address corresponding to the input signal from a configuration table; c) retrieving the motion data including the statuses and the voltage levels required for all segmented electrodes from the configuration table using the line address; d) sending the motion data to a voltage driver; e) activating on-status according to the motion data by enabling the word line of a corresponding memory type cell and applying a corresponding voltage level to the segmented electrode through corresponding bit line; and f) repeating steps a) to e) for all desired surface profiles.

Although the present invention is briefly summarized, the full understanding of the invention can be obtained by the following drawings, detailed descriptions, and appended claims.

DESCRIPTION OF FIGURES

These and other features, aspects and advantages of the present invention will become better understood with reference to the accompanying drawings, wherein.

DETAILED DESCRIPTION OF THE ILLUSTRATED EMBODIMENTS

Figure 1:
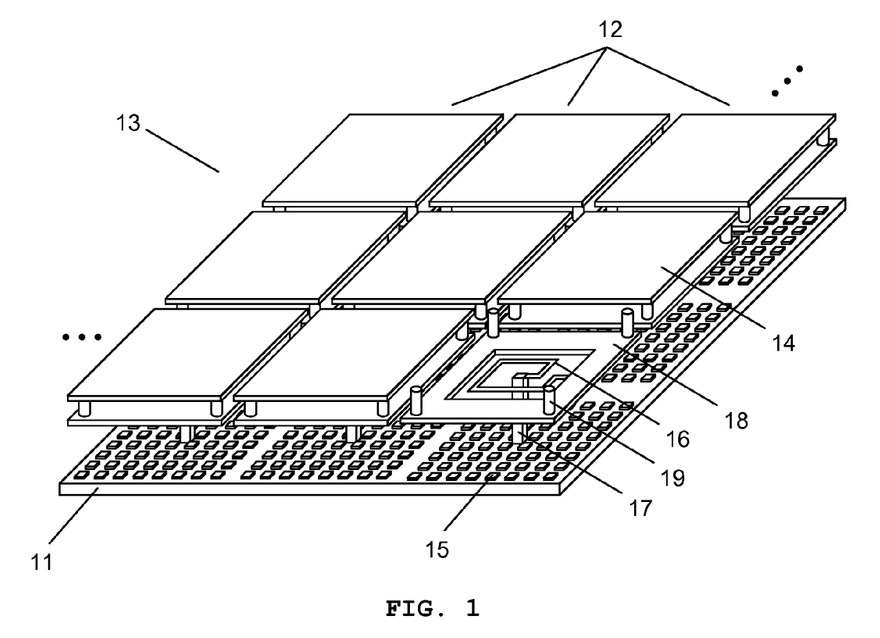
FIG. 1 shows a schematic illustration of a discretely controlled micromirror array device and the structures underneath a micromirror structure.

FIG. 1 shows a schematic illustration of a discretely controlled micromirror array device and the structures underneath a micromirror structure. A discretely controlled micromirror array device comprises a substrate 11 with a control circuitry (not shown) and a plurality of micromirrors 12 forming a micromirror array 13. Each micromirror 12 in the micromirror array 13 comprises a micromirror structure 14 having a reflective surface on one side, a plurality of segmented electrodes 15 disposed on the substrate surface and electronically coupled to the control circuitry for activating segmented electrodes 15 selectively, at least one flexible structure 16 for connecting the micromirror structure 14 and the substrate 11 and providing restoring force to the micromirror 12, and at least one pillar structure 17 for supporting the flexible structure 16 and providing connection between the substrate 11 and the flexible structure 16. The micromirror 12 further comprises at least one top electrode plate 18 disposed underneath the micromirror structure 14. The micromirrors 12 have rotational and translational motions. The rotational and translational motions of each micromirror 12 are controlled to have a required position and orientation by selected set of activated segmented electrodes 15. The micromirrors 12 in the micromirror array 13 form at least one surface profile. The top electrode plate 18 increases the electrostatic force induced between the segmented electrodes 15 and the top electrode plate 18 by reducing the electrostatic gap between the electrodes and increasing the active area of electrodes. The structural deformation of the micromirror structure 14 is reduced by connecting the micromirror structure 14 to the top electrode plate 18 using at least one top electrode post 19.

Figure 2A:
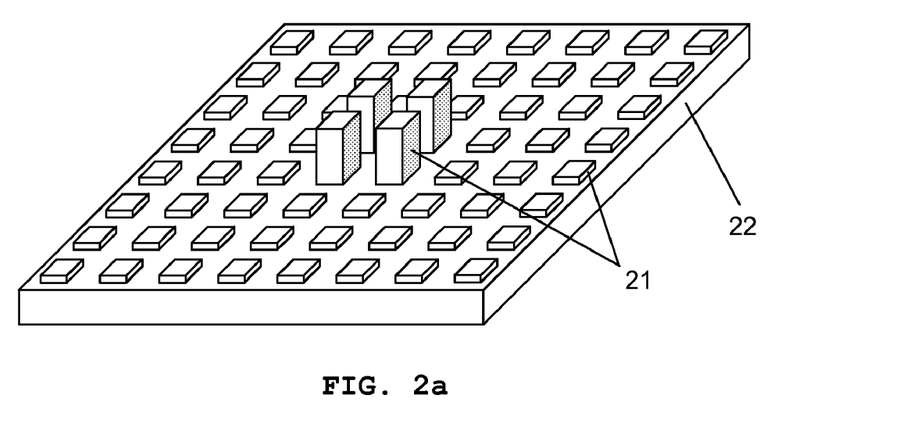
FIG. 2 shows schematic illustrations showing variations in the height of segmented electrodes for a micromirror.
Figure 2B:
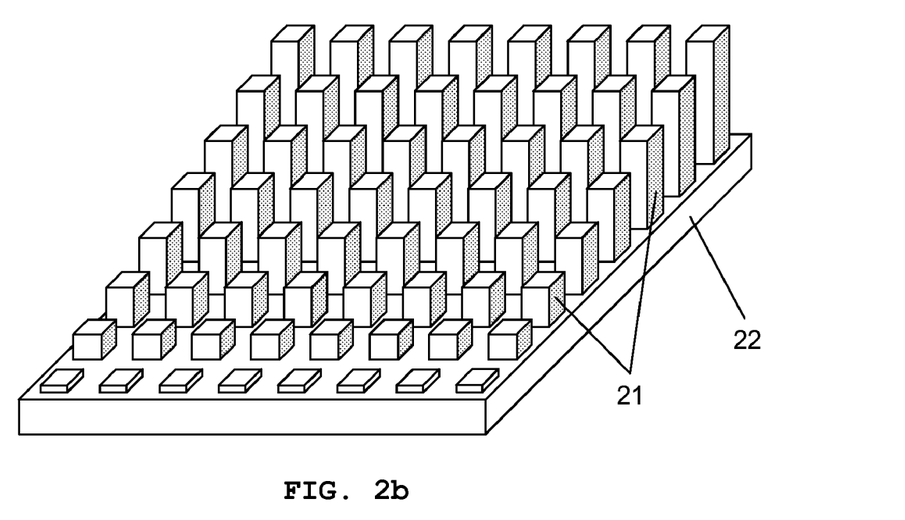

Although the segmented electrodes 15 can have a substantially identical shape and size as shown in FIG. 1, the segmented electrodes 15 can have a plurality of variations in the size and shape depending on applications. The shape and size of the segmented electrodes 15 can be varied in association with the shape and size of the micromirror structure 14 in order to increase the effective actuation area and prevent interference with adjacent micromirror structures. Also, the segmented electrodes 14 can have a plurality of variations in height from the substrate 11 as shown in FIG. 2. FIG. 2 shows schematic illustrations showing variations in the height of segmented electrodes for a micromirror. The segmented electrodes 21 can have a plurality of variations in height from the substrate 22, wherein the height of each segmented electrode 21 is determined so that the induced electrostatic force is maximized without hindering the motion of the micromirror structure. FIG. 2a shows an example of variations in the height of segmented electrodes, where the segmented electrodes 21 proximal to the center of the micromirror is longer than those of the distal to the center of the micromirror. This configuration can be effectively used for the application requiring large rotations of the micromirror such as light switch. FIG. 2b shows another example of variations in the height of segmented electrodes, where the height of segmented electrodes 21 is gradually increased from one side to the other side. This configuration can be effectively used to form surface profiles simulating either concave or convex reflective surface. It should be noted that variations in height of the segmented electrodes mentioned above are examples only, as many other variations in height of the segmented electrodes could be used.

Figure 3A:
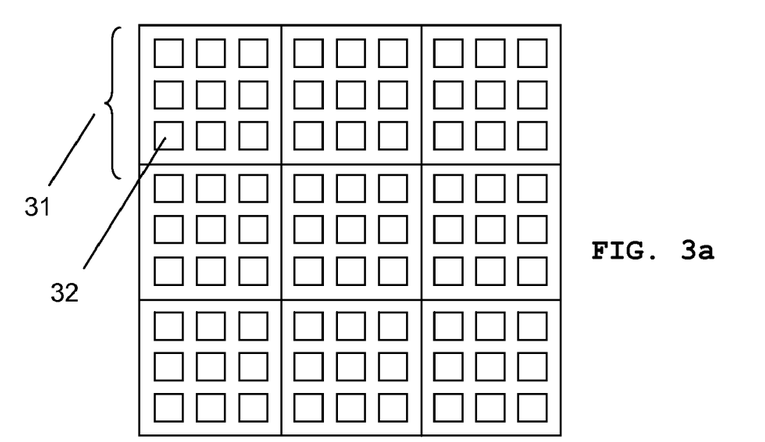
FIG. 3 shows exemplary micromirror arrays to illustrate the various possible arrangements of segmented electrodes.

Referring back to FIG. 1, all micromirrors 12 can have the identical arrangement of its segmented electrodes 15, which allows easier design and fabrication. The appropriate sets of the segmented electrodes that need to be activated to provide the required positions and orientations of each micromirror 12 are evaluated and stored in a configuration table. In this case, the segmented electrodes 15 of each micromirror 12 are distributed with substantially evenly spaced separation as shown in FIG. 3a. For a given position and orientation of the micromirror 12, an optimal or a suboptimal set of the segmented electrodes to be activated can be evaluated to provide a position and orientation of the micromirror 12 substantially close to the desired position and orientation of the micromirror 12. As the number of the segmented electrodes 15 increases, the motion of the micromirror can be adjusted more precisely. On the other hand, the segmented electrodes 15 of each micromirror 12 can be arbitrary distributed as shown in FIG. 3b and 3c to have a plurality of positions and orientations of the micromirror 12 and/or increase the motion accuracy of the micromirror 12.

The motion of each micromirror 12 can be controlled by appropriate combinations of sizes, heights, in-plane positions of the segmented electrodes, and voltages applied to the corresponding segmented electrodes.

Figure 3B:
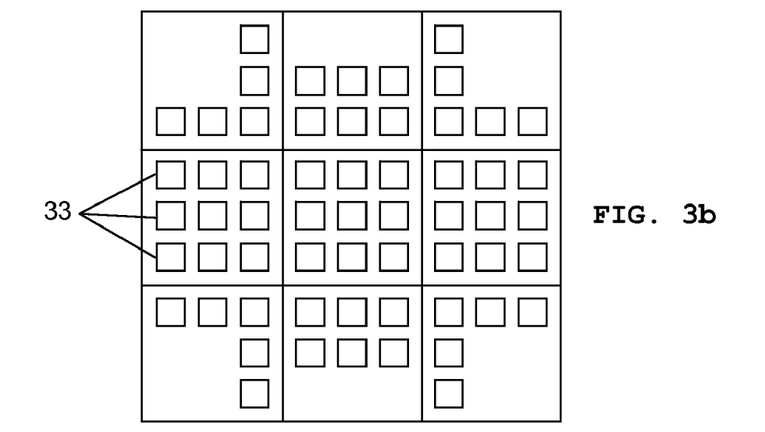
Figure 3C:
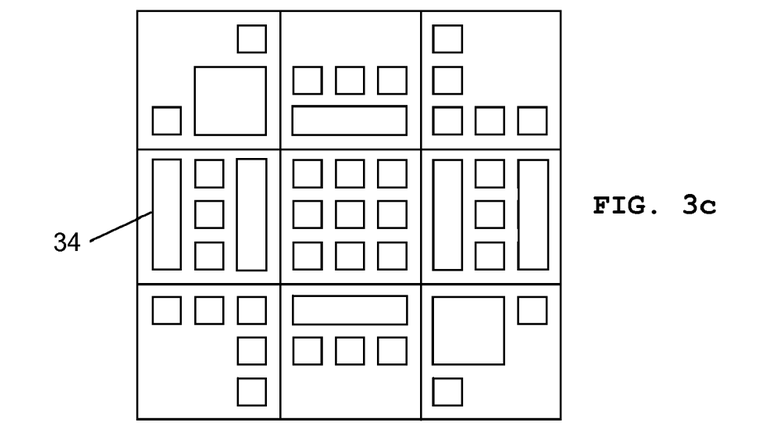

FIG. 3 shows exemplary micromirror arrays to illustrate the various possible arrangements of segmented electrodes. FIG. 3a shows a 3 by 3 micromirror array, wherein each micromirror 31 is controlled by 3 by 3 segmented electrodes 32 distributed with substantially evenly spaced separation. The identical arrangement of the segmented electrodes 32 for all micromirrors 31 allows easier design and fabrication. FIG. 3b shows at least one micromirror has a different arrangement of segmented electrodes, wherein the arrangement of the segmented electrodes for each micromirror is optimized to control the motion of the micromirror, effectively. The best in-plane positions of the segmented electrodes providing the required positions and orientations of each micromirror are evaluated and then segmented electrodes are placed in the corresponding positions on the substrate surface. This arrangement provides better accuracy for controlling the motion of the micromirrors with less segmented electrodes. Furthermore, a group of segmented electrodes for each micromirror having the same statuses for all surface profiles and disposed at the close proximate such as segmented electrodes 33 in FIG. 3b can be replaced with an segmented electrode 34 providing the micromirror with identical rotational and translational motions as shown in FIG. 3c. The number of feasible positions and orientations is $2^m-1$ for a micromirror having m segmented electrodes, which can provide at least $2^m-1$ surface profiles for the micromirror array device. For a given position and orientation of the micromirror, an optimal or a suboptimal set of the segmented electrodes can be found to provide the position and orientation of the micromirror, which are substantially close to the desired position and orientation of the micromirror with the required accuracy. As the number of the segmented electrodes increases, the motion of the micromirror can be adjusted more precisely. It should be noted that variations in arrangement of the segmented electrodes mentioned above are examples only, as many other variations in arrangement of the segmented electrodes could be used.

Figure 4:
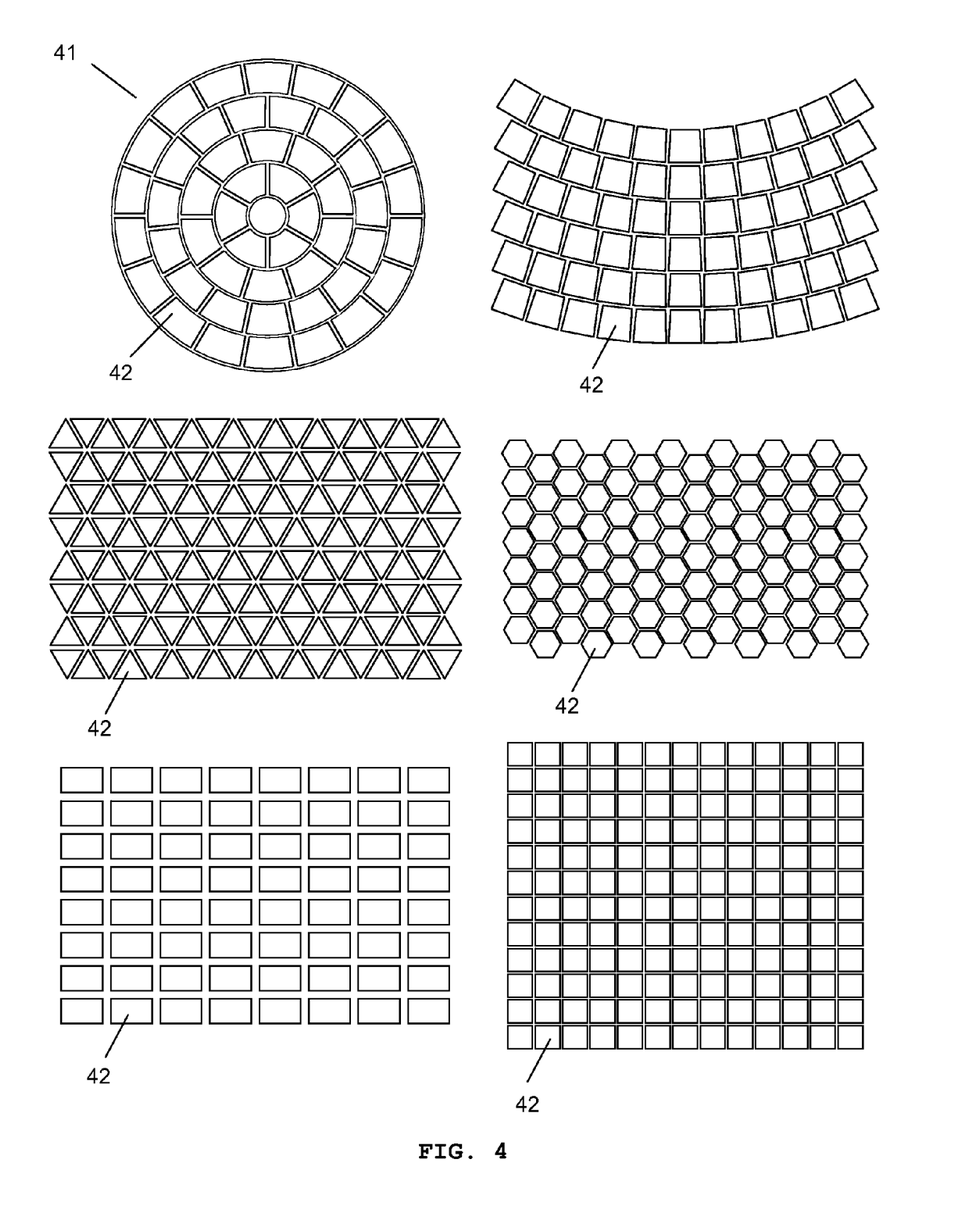
FIG. 4 shows the exemplary arrangements of micromirrors in various the discretely controlled micromirror array devices.

FIG. 4 shows various kinds of the exemplary arrangements of micromirrors in the discretely controlled micromirror array devices 41. Micromirrors can have various shapes such as a fan shape, a hexagonal shape, a rectangular shape, a square shape, a triangular shape, mixed shapes, etc. The shape of the micromirror is determined by the application of the micromirror array device and the geometry of the optical system that the micromirror array device is applied. Preferably, the micromirrors are arranged depending on the geometry of the optical system to have better performance. Each micromirror 42 of the discretely controlled micromirror array device 41 is electrostatically and/or electromagnetically controlled by selectively activated segmented electrodes. The mechanical structures holding micromirror structures and the segmented electrodes are located underneath the micromirror structures so that the micromirrors 42 are to be closer to one another in order to increase the effective reflective area or optical efficiency. It should be noted that the arrangements of the micromirrors mentioned above are examples only. The size and shape of the micromirror array should be determined depending on the applications and the geometry of the optical system.

Figure 5:
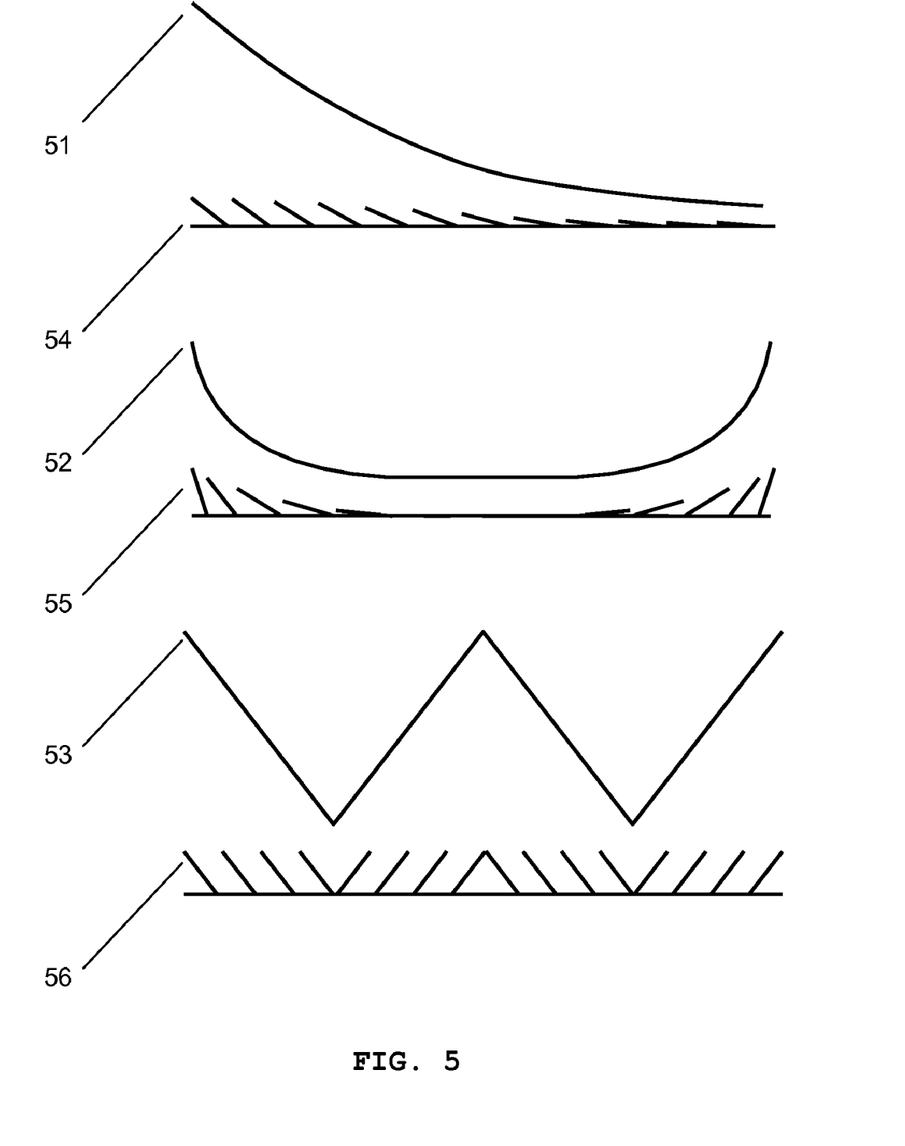
FIG. 5 shows exemplary surface profiles that the discretely controlled micromirror array device can provide.

Unlike conventional micromirror array providing only axis-symmetric surface profile, the discretely controlled micromirror array device in the present invention can reproduce various surfaces including, but not limited to, spherical, aspherical (e.g. parabolic, hyperbolic, elliptical, etc.), anamorphic, and non-axis-symmetric shapes. FIG. 5 shows exemplary surface profiles that the discretely controlled micromirror array device can reproduce. A non-axis-symmetric 51, U-shaped 52, or W-shaped 53 aspherical surface is reproduced by a discretely controlled micromirror array device with the corresponding surface profile 54, 55, or 56, respectively.

Figure 6:
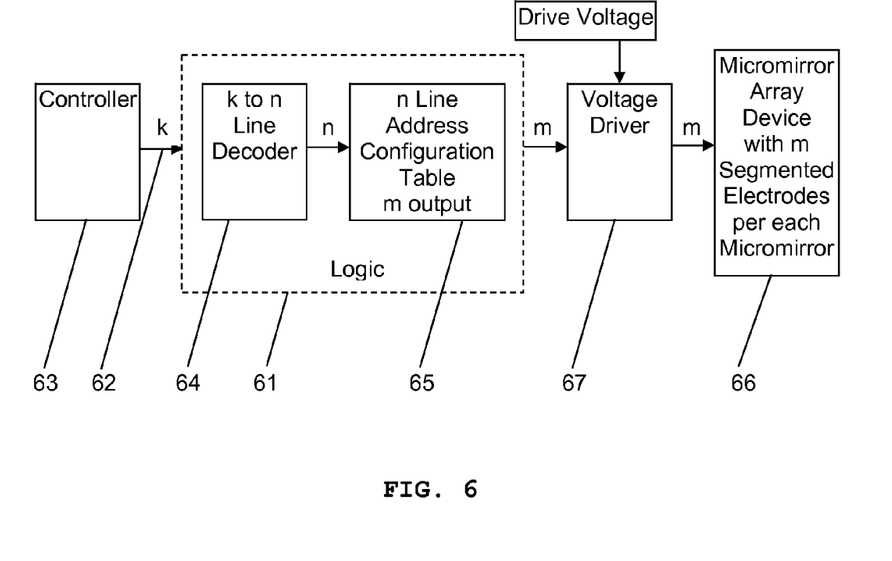
FIG. 6 is a schematic illustration showing how an electronic circuit in a discretely controlled micromirror array device works.

FIG. 6 is a schematic illustration showing how an electronic circuit in a discretely controlled micromirror array device works for n desired surface profiles with k input channels and m segmented electrodes. When the discretely controlled micromirror array device has to provide n surface profiles, at least $\log_2 n$ input channels are required if digital signals are used. In this case, at least one micromirror in the discretely controlled micromirror array device has to be able to provide n positions and orientations. Once the desired surface profile of the discretely controlled micromirror array device is chosen, the corresponding input signals are sent to a logic device 61 through input channels 62 by a controller 63. A decoder 64 in the logic device 61 decodes the signals received from the input channels 62. The configuration table 65 in the logic device 61 includes line addresses, wherein each line address represents the corresponding surface profile that the discretely controlled micromirror array device has to reproduce. In addition, the configuration table includes the statuses and voltage levels of segmented electrodes 66 for each surface profile. The configuration table 65 is pre-generated and stored in ROM (Read Only Memory) device or programmed by PLD (Programmable Logic Device). The decoded signal is sent to the configuration table 65 and a line address corresponding to the desired surface profile is accessed. The logic device 61 outputs the required statuses of m segmented electrodes 66 for the desired surface profile. According to the required statuses of segmented electrodes 66, a voltage driver 67 turns the corresponding switches (not shown) on or off and applies the voltage across the switches. When a switch turns on, the current flows and charges a memory type cell underneath a corresponding segmented electrode 66 in order to provide voltage difference between the segmented electrode 66 and the top electrode plate. Activated segmented electrodes 66 in each set of segmented electrodes attract the portions of the corresponding micromirror structure or top electrode plate in order to make the micromirror have the required position and orientation. The motion of each micromirror is independently controlled by selectively activating its segmented electrodes to have the required position and orientation and form the desired surface profile. The number of input channels 61 depends on the number of surface profiles that the discretely controlled micromirror array device has to reproduce but is neither affected by a number of micromirrors nor a number of segmented electrodes.

Figure 7A:
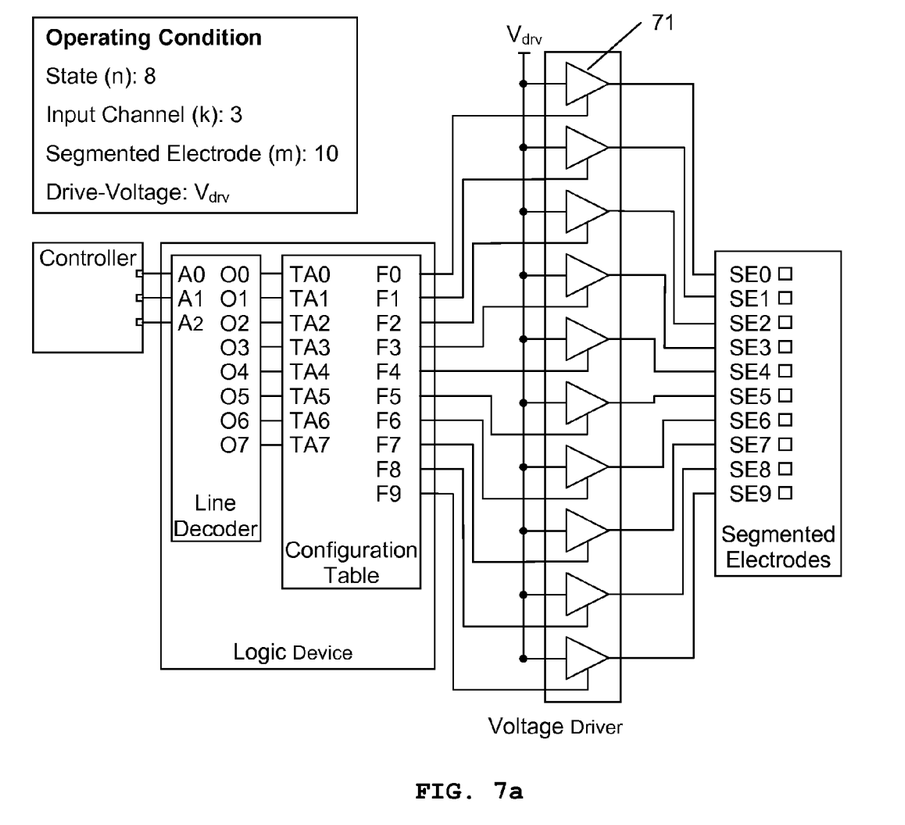
FIG. 7a shows an exemplary schematic illustration about how a micromirror element operates.
Figure 7B:
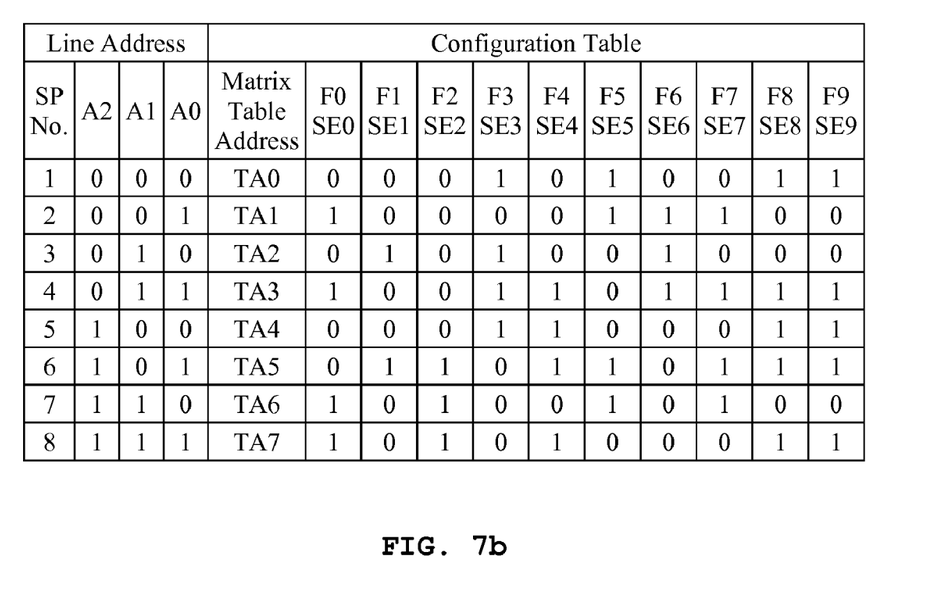
FIG. 7b shows an exemplary configuration table.

FIG. 7a shows an exemplary schematic illustration about how a micromirror with ten segmented electrodes operates to provide eight required positions and orientations. Since the micromirror element has to provide eight different positions and orientations, at least three input channels are required in the digital operation. A line decoder in a logic device decodes three input signals (A0, A1, and A2) into eight output signals (Q0, Q1 . . . Q7). The logic device receives eight output signals from the decoder and accesses the corresponding line address (TA0, TA1 . . . TA7) in a configuration table. Since the micromirror has ten segmented electrodes (SE0, SE1 . . . SE9), the configuration table includes the statuses of ten segmented electrodes for each line address. A voltage driver turns the corresponding switches 71 on or off according to the statuses of segmented electrodes in the configuration table and applies the voltage across the switches 71. The exemplary configuration table is shown in FIG. 7b. The first column represents the list of positions and orientations that the micromirror has to provide, and the second to fourth column represents the corresponding line addresses. SE0 to SE9 (or from F0 to F9) represents the on/off statuses of segmented electrodes for each required motion. When a switch turns on, the current flows and charges a memory type cell underneath a corresponding segmented electrode in order to provide voltage difference between the segmented electrode and the top electrode plate. According to the configuration table, the exemplary micromirror member provides eight different positions and orientations using three input channels and ten segmented electrodes. Although this example provides only eight different positions and orientations, ideally it can provide up to $2^{10}-1$ different positions and orientations because it has ten segmented electrodes. This example can readily be expanded to the discretely controlled micromirror array device comprising a plurality of micromirrors in order to provide multiple surface profiles without losing generality by simply adding more segmented electrodes for the other micromirrors in the configuration table.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A discretely controlled micromirror array device comprising:
    a substrate with a control circuitry; and
    a plurality of micromirrors forming a micromirror array;
wherein the micromirrors have rotational and translational motions and the micromirrors in the micromirror array form at least one surface profile and wherein each micromirror in the micromirror array comprises:
    a micromirror structure having a reflective surface on one side;
    a plurality of segmented electrodes disposed on the substrate surface and electronically coupled to the control circuitry for activating the segmented electrodes selectively;
    at least one flexible structure, wherein the flexible structure connects the micromirror structure and the substrate and provides restoring force to the micromirror structure; and
    at least one pillar structure, wherein the pillar structure supports the flexible structure and provides connection between the substrate and the flexible structure;
wherein the motion of the micromirrors is controlled by selectively activated segmented electrodes and wherein the control circuitry is coupled with the segmented electrodes and selectively activates or deactivates the segmented electrodes.

2. The discretely controlled micromirror array device of claim 1, wherein the control circuitry is an electrical addressing circuitry.

3. The discretely controlled micromirror array device of claim 2, wherein the electrical addressing circuitry comprises a plurality of memory type cell forming a memory addressing array.

4. The discretely controlled micromirror array device of claim 3, wherein the memory addressing array comprises SRAM circuits to activate or to deactivate the segmented electrodes.

5. The discretely controlled micromirror array device of claim 3, wherein the memory addressing array comprises DRAM circuits to activate or to deactivate the segmented electrodes.

6. The discretely controlled micromirror array device, of claim 1, wherein the control circuitry comprises a MOS-type or CMOS-type circuitry on the substrate.

7. The discretely controlled micromirror array device of claim 1, wherein the control circuitry is electronically isolated by a passivation layer.

8. The discretely controlled micromirror array device of claim 1, wherein the control circuitry is operated by digital voltage.

9. The discretely controlled micromirror array device of claim 1, wherein the control circuitry supplies a fixed voltage to the segmented electrodes for activation.

10. The discretely controlled micromirror array device of claim 1, wherein the control circuitry supplies discrete control signal to the segmented electrodes.

11. The discretely controlled micromirror array device of claim 1, wherein the control circuitry supplies a plurality of discrete voltage levels to the segmented electrodes so that each segmented electrode can be controlled by a different voltage.

12. The discretely controlled micromirror array device of claim 1, wherein the control circuitry is constructed underneath the segmented electrodes.

13. The discretely controlled micromirror array device of claim 1, wherein the micromirror has one degree of freedom rotational motion.

14. The discretely controlled micromirror array device of claim 1, wherein the micromirror has one degree of freedom translational motion.

15. The discretely controlled micromirror array device of claim 1, wherein the micromirror has two degrees of freedom rotational motion.

16. The discretely controlled micromirror array device of claim 1, wherein the micromirror has one degree of freedom rotational and one degree of freedom translational motions.

17. The discretely controlled micromirror array device of claim 1, wherein the micromirror has two degrees of freedom rotational and one degree of freedom translational motions.

18. The discretely controlled micromirror array device of claim 1, wherein the motion of each micromirror is independently controlled.

19. The discretely controlled micromirror array device of claim 1, wherein the motion of each micromirror is discretely controlled to have a plurality of positions and orientations for forming a plurality of surface profiles.

20. The discretely controlled micromirror array device of claim 19, wherein the motion of the micromirror is controlled by activating a selected set of the segmented electrodes.

21. The discretely controlled micromirror array device of claim 19, wherein the motion of the micromirror is controlled by supplying a plurality of voltage levels to all or a part of segmented electrodes that need to be activated.

22. The discretely controlled micromirror array device of 1, wherein the micromirror array reproduces a predetermined free surface.

23. The discretely controlled micromirror array device of claim 1, wherein the surface profile of the micromirror array satisfies a convergence condition.

24. The discretely controlled micromirror array device of claim 1, wherein the surface profile of the micromirror array satisfies a phase matching condition.

25. The discretely controlled micromirror array device of claim 1, wherein the surface profile of the micromirror array satisfies a convergence and a phase matching conditions.

26. The discretely controlled micromirror array device of claim 25, wherein the micromirror array forms a Micromirror Array Lens having the surface profile with satisfying the convergence and the phase matching conditions.

27. The discretely controlled micromirror array device of claim 1, wherein the micromirror array has a plurality of surface profiles.

28. The discretely controlled micromirror array device of claim 27, wherein the surface profile is discretely controlled.

29. The discretely controlled micromirror array device of claim 27, wherein each surface profile satisfies a convergence and a phase matching conditions.

30. The discretely controlled micromirror array device of claim 29, wherein the micromirror array forms a variable focusing Micromirror Array Lens having the plurality of surface profile with satisfying the convergence and the phase matching conditions.

31. The discretely controlled micromirror array device of claim 1, wherein the micromirror array further comprises an electronic circuit to process input data and control the micromirror control circuitry to form the surface profile.

32. The discretely controlled micromirror array device of claim 31, wherein the electronic circuit provides a discrete input signal to the micromirror array to form the corresponding surface profile.

33. The discretely controlled micromirror array device of claim 31, wherein the electronic circuit has a configuration table to store motion data of the surface profile.

34. The discretely controlled micromirror array device of claim 33, wherein the motion data includes a status of each segmented electrode.

35. The discretely controlled micromirror array device of claim 31, wherein the motion data includes a voltage level to be applied to each augmented electrode.

36. The discretely controlled micromirror array device of claim 1, wherein the reflective surface of each micromirror has a high reflectivity provided by a metal layer.

37. The discretely controlled micromirror array device of claim 36, wherein the metal layer is made of a material selected from the group consisting of silver (Ag), aluminum (Al), gold (Au), nickel (Ni), chromium (Cr), and platinum (Pt) to have high reflectivity.

38. The discretely controlled micromirror array device of claim 36, wherein the metal layer is protected by additional coating layer deposited on the metal layer with a material selected from the group consisting of silicon oxide ($SiO_2$), aluminum oxide ($Al_2O_3$), magnesium oxide (MgO), titanium oxide ($TiO_2$), cesium oxide ($CeO_2$), silicon nitride ($Si_3N_4$), titanium nitride (TiN), magnesium fluoride ($MgF_2$), calcium fluoride ($CaF_2$), zinc sulfide (ZnS), zinc selenide (ZnSe), polycarbonate, polyester, polyethylene naphthalate, and fluoropolymer.

39. The discretely controlled micromirror array device of claim 36, wherein the reflectivity of the metal layer is enhanced by dielectric coating layers.

40. The discretely controlled mioromirror array device of claim 1, wherein the reflective surface of each micromirror has a high reflectivity provided by dielectric layers.

41. The discretely controlled micromirror array device of claim 1, wherein the segmented electrodes are selectively activated by the control circuitry and induce electrostatic force to control the motions of the micromirrors.

42. The discretely controlled micromirror array device of claim 41, wherein the shape of the segmented electrodes is substantially identical.

43. The discretely controlled micromirror array davies of claim 41, wherein the size of the segmented electrodes is substantially identical.

44. The discretely controlled micromirror array device of claim 41, wherein the segmented electrodes have a plurality of variations in size.

45. The discretely controlled micromirror array device of claim 41, wherein the segmented electrodes have a plurality of variations in shape.

46. The discretely controlled micromirror array device of claim 41, wherein the segmented electrodes have a plurality of variations in height from the substrate.

47. The discretely controlled micromirror array device of claim 41, wherein the segmented electrodes of each micromirror are distributed with evenly spaced separation.

48. The discretely controlled micromirror array device of claim 41, wherein the segmented electrodes of each micromirror are arbitrary distributed to have a plurality of positions and orientations.

49. The discretely controlled micromirror array device of claim 41, wherein the segmented electrodes of each micromirror are arbitrary distributed to increase the accuracy of the motion of the micromirror.

50. The discretely controlled micromirror array device of claim 1, wherein the micromirror further comprises at least one top electrode plate disposed underneath the micromirror structure.

51. The discretely controlled micromirror array device of claim 50 wherein the top electrode plate increases electrostatic force induced between the segmented electrodes and the top electrode plate.

52. The discretely controlled micromirror array device of claim 50, wherein the structural deformation of the micromirror structure is reduced by connecting the micromirror structure to the top electrode plate using at least one top electrode post.

53. The discretely controlled micromirror array device of claim 50, wherein the flexible structure is located in the same layer with top electrode plate.

54. Thu discretely controlled mioromirror array device of claim 1, wherein the flexible structure has rotational symmetry around the center of the miaromirror.

55. The discretely controlled micromirror array device of claim 1, wherein the micromirrors in the micromirror array have independently controlled motions to make a spatial light modulator.

56. The discretely controlled micromirror array device of claim 55, wherein the micromirrors in the spatial light modulator are controlled to retract or elevate to remove the phase aberration of an optical system.

57. The discretely controlled micromirror array device of claim 55, wherein the one degree of freedom rotation of the micromirrors is controlled to control light intensity.

58. The discretely controlled micromirror array device of claim 55, wherein the two degrees of freedom rotation of the micromirrors is controlled to control light intensity.

59. The discretely controlled micromirror array device of claim 55, wherein the one degree of freedom rotation of the micromirrors is controlled to scan a field of regard.

60. The discretely controlled micromirror array device of claim 55, whsreifl the two degree of freedom rotation of the micromirrors is controlled to scan a field of regard.

* * * * *